Patented May 16, 1944

2,349,152

UNITED STATES PATENT OFFICE 2,349,152

IMPREGNATING GAUZE

Wolffe Harry Feinstone, Stamford, Conn., assignor to American Cyanamid Company, New York, N. Y., a corporation of Maine No Drawing. Application September 10, 1941, Serial No. 410,293

3 Claims. (Cl. 167—84)

This invention relates to the impregnation of gauze and is more particularly concerned with including sulfadiazine in such impregnation treatment.

Hospital gauze for use in operations and the like is usually prepared by impregnating the gauze with petroleum jelly and sterilizing the gauze so prepared. This operation is usually carried out by placing layers of the gauze in a suitable metal container, adding petroleum jelly thereto and placing the entire container in an autoclave where it is subjected to about 15 pounds pressure of steam for about 15 minutes. This brings about sterilization of the gauze and at the same time melts the petroleum jelly, impregnates the gauze and makes it suitable for use in operations and the like.

Sulfadiazine has been used in an increasing amount in post-operative procedure. However, such use has been attended with some inconvenience due to the necessity of separate handling and the like. It would be desirable to mix sulfadiazine with the petroleum jelly used to impregnate the gauze as described above but since the sulfadiazine is not soluble in the petroleum jelly, mixtures thereof separate into their several constituents and uniform impregnation of the several layers of the gauze would not be obtained.

I have now found that I may impregnate the hospital gauze during the sterilization operation with a mixture of sulfadiazine with petroleum jelly or lanolin in accordance with the usual practice if the mixture is used in the form of a suitable emulsion. This serves to impregnate the gauze with the petroleum jelly or the lanolin as in the past and, at the same time distributes the sulfadiazine uniformly throughout the mass of gauze.

More specifically the following is descriptive of one form of my invention which is not limited to the specific details thereof. The quantities throughout are by weight unless otherwise specified.

A mixture is made of the following:

| | Parts |
|---|---|
| Petroleum jelly | 54 |
| Sulfadiazine | 5 |
| Triethanolamine | 2 |
| Stearic acid | 4 |
| Water | 35 |

This mixture is converted into an emulsion by the use of a suitable stirring device and homogenizer to produce a homogeneous and stable, thin paste.

In the use of this emulsion, a number of layers of gauze are placed in a metal container as is the customary hospital technique and there is then added a suitable amount of the emulsion. A cover is then placed on the container and the whole is put into an autoclave where it is subjected to a pressure of about 15 pounds of steam for 15 minutes. The box and its contents are completely sterilized and the emulsion will be found to have been dispersed uniformly throughout all of the layers of the gauze so that each layer of gauze contains substantially the same amount of petroleum jelly and sulfadiazine.

To facilitate impregnation of the gauze, it is sometimes preferred to wet the gauze with a dilute solution of a wetting agent and to wring out any excess solution prior to placing the gauze in the metal container and prior to the addition of the emulsion. In the alternative, the wetting agent may be incorporated into the emulsion so long as such agent is of a type as will not break down the emulsion. As illustrative, the suitable wetting agent may be selected from one or more of the following types: diamyl, dihexyl or dioctyl sulfosuccinic esters and salts thereof, salts of alkylated naphthalene sulfonic acids, long chain quaternary ammonium compounds, sulfonated or sulfated higher alcohols, e. g. lauryl sulfate, the salts of the sulfated or sulfonated higher alcohols, sulfonated oils of the mineral or vegetable type, aromatic sulfonates, soaps, etc.

The method of preparation of the emulsion may be varied considerably without effecting the results to any great extent. By varying the amount of water in the emulsion, the consistency thereof is correspondingly changed although for most purposes a thin paste is suitable. In place of the petroleum jelly, I may use lanolin which, for the same ratio of ingredients, gives a correspondingly heavier paste. Other substances may be added to the mixtures in preparing the emulsions so long as they do not interfere with the action of the sulfadiazine and the petroleum jelly or lanolin. Thus the addition of ¼ of 1% allantoin to the mixture has been found to serve a useful purpose.

The emulsions utilized in the present invention are stable for long periods of time and do not spoil or discolor even upon being exposed to the air. They serve to impregnate the gauze uniformly with the petroleum jelly or lanolin and at the same time permit a uniform distribution of the sulfadiazine throughout the several layers of gauze treated. These emulsions are used in exactly the same manner as has been done previously with the petroleum jelly and require no new technique.

It will be obvious that many modifications and variations in the processes and compositions described in my invention may be made without departing from the spirit and scope of the invention as defined in the appended claims.

I claim:

1. The process of treating gauze which comprises heating the gauze in contact with an aqueous emulsion containing dispersed sulfadiazine and a greasy substance selected from the group consisting of petroleum jelly and lanolin, the heating being carried out at a temperature and for a time sufficient to sterilize the gauze and to melt the greasy substance so that it is dispersed substantially uniformly throughout the gauze, together with the sulfadiazine.

2. The process of treating gauze which comprises moistening the gauze with a dilute solution of a wetting agent and heating the gauze in contact with an aqueous emulsion containing dispersed sulfadiazine and a greasy substance selected from the group consisting of petroleum jelly and lanolin, the heating being carried out at a temperature and for a time sufficient to sterilize the gauze and to melt the greasy substance so that it is dispersed substantially uniformly throughout the gauze, together with the sulfadiazine.

3. The process of treating gauze which comprises heating the gauze in contact with an aqueous emulsion containing dispersed sulfadiazine, triethanolamine stearate and a greasy substance selected from the group consisting of petroleum jelly and lanolin, the heating being carried out at a temperature and for a time sufficient to sterilize the gauze and to melt the greasy substance so that it is dispersed substantially uniformly throughout the gauze, together with the sulfadiazine.

WOLFFE HARRY FEINSTONE.